United States Patent [19]
Cohen et al.

[11] 3,994,811
[45] Nov. 30, 1976

[54] PROTEIN SKIMMER AND CARBON FILTRATION REPLACEABLE UNIT

[76] Inventors: Harvey Kenneth Cohen; Arnold Franklin Conn, both of 1015 E. 35th St., Brooklyn, New York, N.Y. 11210

[22] Filed: June 12, 1975

[21] Appl. No.: 586,186

[52] U.S. Cl. .......................... 210/169; 210/221 R; 210/240; 210/244; 210/320
[51] Int. Cl.² .......................................... E04H 3/20
[58] Field of Search ........... 210/169, 221, 240, 244, 210/320; 15/1.7

[56] References Cited
UNITED STATES PATENTS

| | | | |
|---|---|---|---|
| 1,055,082 | 3/1913 | Rogers | 210/169 X |
| 3,294,239 | 12/1966 | Dayes | 210/169 |
| 3,616,919 | 11/1971 | Feddern | 210/169 |
| 3,719,278 | 3/1973 | Kolfertz | 210/169 |
| 3,850,806 | 11/1974 | Cohen | 210/169 |

Primary Examiner—Theodore A. Granger
Attorney, Agent, or Firm—Peter L. Berger

[57] ABSTRACT

A replaceable protein skimmer and carbon filtration unit is disclosed for use with a vertical lift aquarium filtration system. The normal flow path through the vertical lift to returning the air-water mixture to the aquarium is diverted through an integrally formed plastic unit housing a carbon filtration chamber through which the diverted air-water mixture passes.

5 Claims, 1 Drawing Figure

U.S. Patent  Nov. 30, 1976  3,994,811
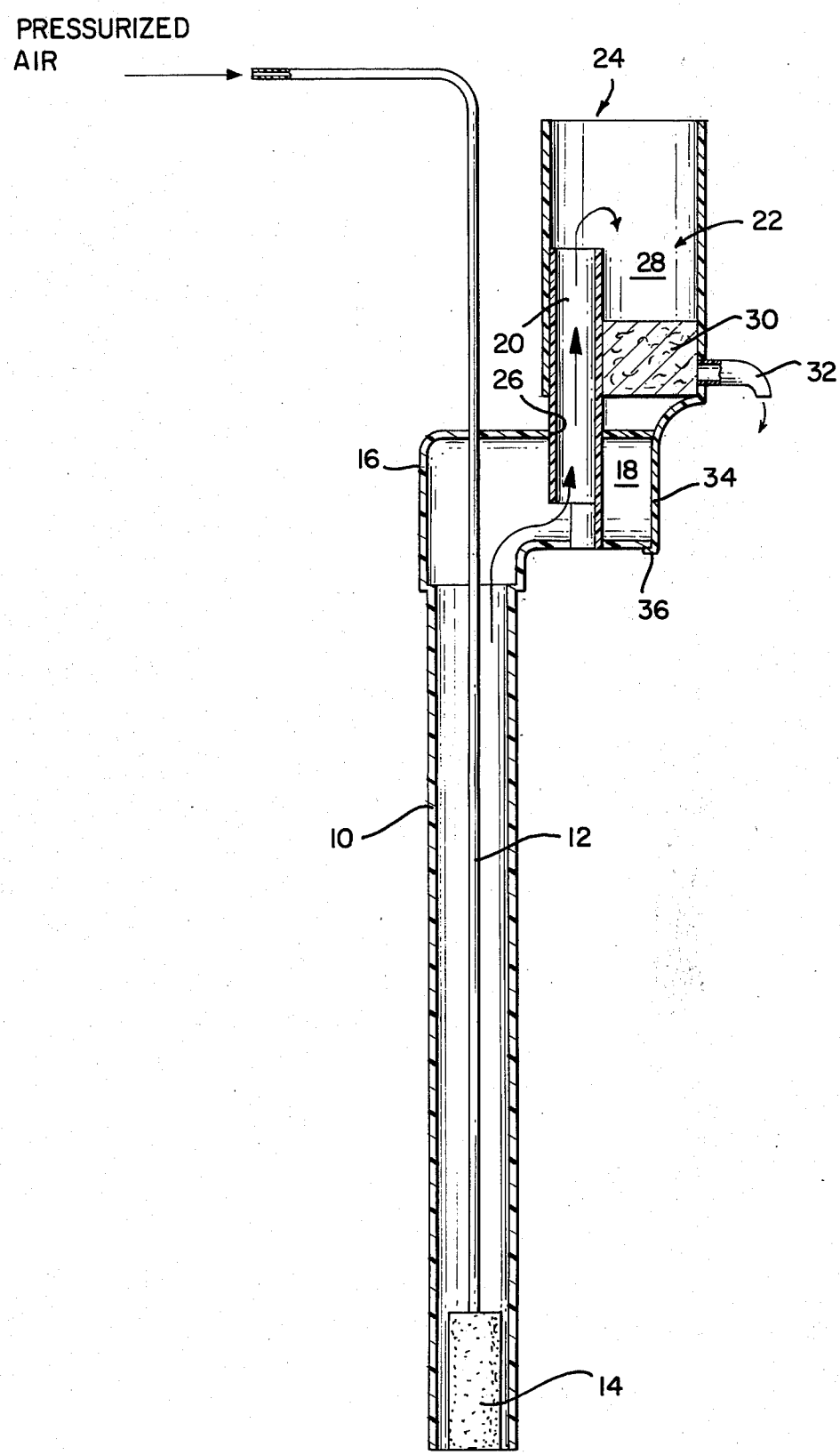

PROTEIN SKIMMER AND CARBON FILTRATION REPLACEABLE UNIT

BACKGROUND OF THE INVENTION

This invention relates to a combined protein skimmer and carbon filtration unit for use with a vertical air lift type water recirculating filter system.

Carbon filtration systems are often used in aquarium filters, and these carbon filtration systems comprise bags or other types of carbon medium through which the water passes. Generally, these filtration bags are housed outside the aquarium tank and a recirculating pump enables the water to pass therethrough.

In a prior U.S. Pat. Re28,116 and Pat. No. 3,850,806, a recirculating undergravel filter system is disclosed in which there is an inner air-carrying tube within an outer water-carrying tube, the inner air-carrying tube terminating in an air stone. As the water lifts through the outer water-carrying tube, the air-water mixture at the point of the air stone continues to further lift and is recirculated through the spout end of the water-carrying tube to return to the aquarium. The advantages of the tube-in-tube recirculating filter system are discussed in great detail in those patents.

In a prior application, Ser. No. 397,639, there is disclosed a protein skimmer adaptable for use with the recirculating aquarium filters in the above-identified patents, the protein skimmer being attached to the water-carrying tube at the upper end thereof to form by foam fractionation a frothy scum or foam which is carried into the protein skimmer and is removed therefrom further enhancing the cleaning of the water before it returns to the aquarium tank.

It would be desirable to provide a further filtration medium, such as a carbon filtration system, through which the recirculating water passes prior to being returned to the aquarium tank.

An object of this invention is to provide a carbon filtration system for use with the recirculating filter systems of the above-identified patents.

Another object of this invention is to provide such a carbon filtration system for use in combination with a protein skimmer so as to provide a replaceable protein skimmer and carbon filtration unit.

Another object of this invention is to provide such a unit which is inexpensive to manufacture, easy to use and effective in operation.

Still another object of this invention is to provide such a unit which is made of inexpensive materials and is adapted to be easily accommodated to the above-identified described filter system.

Other objects, advantages and features of this invention will become more apparent from the following description.

SUMMARY OF THE INVENTION

In accordance with the principles of this invention, the above objects are accomplished by providing with an aquarium having a recirculating water flow filter system and a protein skimmer which by foam fractionation cleans the recirculating water, a protein skimmer and replaceable carbon filtration unit adapted to be connected to the air-water mixture carrying element of the filtration system. Diversion means are provided as part of the unit which blocks the normal egress or spout end of the air-water conduit means forcing the water to pass through the unit, passing through the carbon filtration system as well as achieving the foam fractionation cleaning process.

The unit is formed of a plastic material and has a connecting tube insertable in an aperture in the conduit or air-water mixture carrying tube of the filtration system so as to form a fixed and rigid connection. A baffle means is integrally formed with the unit and is adapted to be pressed against the open end of the tube to prevent water from flowing out the normal opening of the tube and forcing the water to be diverted through the unit before returning to the aquarium tank.

BRIEF DESCRIPTION OF THE DRAWING

The FIGURE is a sectional view of the recirculating filter system water-air mixture carrying tube to which is connected the replaceable carbon filtration and protein skimmer unit of this invention.

DETAILED DESCRIPTION

Referring to the drawing, there is shown an air lift tube 10 having an inner concentric air carrying tube 12 terminating in an air diffuser 14, the air diffuser 14 allowing pressurized air to enter the column or tube 10. The diffused air produces small numerous bubbles and as the total surface area of the bubbles rises, an air stripping process takes place. In Pat. No. Re28,116 and U.S. Pat. No. 3,850,806 the air lift tube 10 forms a part of an aquarium filter system which is generally available. The air lift tube 10 terminates at its upper end in an elbow bend 16 which normally allows the air-water mixture to be carried up to be returned to the aquarium through an opening 18, normally the spout end opening of air lift tube or conduit means 10. For more details as to the nature and operation of the aquarium filter partially illustrated in the Figure, reference is made to the prior above-identified patents.

In a prior application Ser. No. 397,639 filed Sept. 17, 1973, there is disclosed a protein skimmer adapted for use with the air-lift tube 10. An aperture is provided in the air lift tube through which a connecting means 20 is inserted, and a baffle is provided allowing a foam fractionation effect to take place. The foam fractionation effect will allow a frothy scum to rise through the connecting tube 20 to the protein skimmer chamber 22. The air-water mixture flows out the normal spout end opening of the air lift tube or conduit means 10 as at 18 as described above.

In accordance with the principles of this invention, a replaceable protein skimmer and carbon filtration unit 24 is provided which is attached by the connection means or male plug member 20 at an aperture or female socket means 26 in the air lift tube or conduit means 10 in the elbow portion 16. The unit 24 comprises the above-described protein skimmer portion having a container 28 for holding the frothy scum and a carbon filtration medium 30. A spout 32 is connected as part of the unit. A diverting or baffle means 34 is integrally formed with the unit and is adapted to fit over the spout end of air lift tube 10 at opening 18 so as to block the normal egress point for the air-water mixture. Thus, the air-water mixture passes through connection means or tube 20 up to compartment 28, through the carbon medium 30 and exits by way of spout 32 to return to the aquarium tank. The depending diverting means 34 is formed of a resilient material, such as plastic, and has a hook 36 adapted to hook on to the bottom of the air lift tube at the opening 18 in order to enhance the rigidity of the blocking or diverting function thereof. The resiliency of the depending portion 34 will enable a force fit to be maintained at the open end thus enabling the diverting effect to be efficiently achieved.

The above invention has been described as one preferred embodiment, while other variations thereof are deemed to be covered and protected by this patent application.

We claim:

1. For a recirculating type aquarium filter for cleansing aquarium water which comprises a vertical tube carrying the water upwardly to a horizontal tube integral with said vertical tube located above the water in the aquarium, the horizontal tube returning the cleansed water to the aquarium through a spout end, the improvement comprising a replaceable carbon filtration and water cleansing unit comprising a container located above and connected to said horizontal tube, a vertical connecting tube connecting said horizontal tube to said container, said vertical connecting tube comprising a baffle at the bottom thereof to trap and lift foam in the water to said container for cleansing the water, said horizontal tube comprising an aperture in which said vertical connecting tube with said baffle is securely fit, a carbon filter housed in said container, said container comprising a spout through which water passes, and diverting means for blocking water normally flowing out of said spout end of said horizontal tube to flow through said carbon filter and out of spout of said container for return to said aquarium.

2. A replaceable carbon filtration and water cleansing unit as set forth in claim 1, wherein said diverting means comprises a cap flushly fitting against said spout end of said horizontal tube.

3. A replaceable carbon filtration and water cleansing unit as set forth in claim 2, wherein said cap comprises a downwardly projecting fixed wall integral with said container.

4. A replaceable carbon filtration and water cleansing unit as set forth in claim 3, wherein said vertical connecting tube, said fixed wall and said container are integrally formed of a plastic material.

5. A replaceable carbon filtration and water cleansing unit as set forth in claim 3, wherein said fixed wall terminates in a hook attachable to said horizontal tube for securely maintaining said cap in place.

* * * * *